US009085445B2

(12) United States Patent
Miyazaki

(10) Patent No.: US 9,085,445 B2
(45) Date of Patent: Jul. 21, 2015

(54) WINCH BRAKING DEVICE

(71) Applicant: Hitachi Sumitomo Heavy Industries Construction Crane Co., Ltd., Taitou-ku, Tokyo (JP)

(72) Inventor: Tadashi Miyazaki, Tsuchiura (JP)

(73) Assignee: Hitachi Sumitomo Heavy Industries Construction Crane Co., Ltd., Tokyo (JP)

( * ) Notice: Subject to any disclaimer, the term of this patent is extended or adjusted under 35 U.S.C. 154(b) by 49 days.

(21) Appl. No.: 14/035,242

(22) Filed: Sep. 24, 2013

(65) Prior Publication Data

US 2014/0083806 A1 Mar. 27, 2014

(30) Foreign Application Priority Data

Sep. 25, 2012 (JP) ................................ 2012-210977

(51) Int. Cl.
*F16D 65/22* (2006.01)
*B66D 5/28* (2006.01)
*B66D 5/14* (2006.01)
*B66D 5/26* (2006.01)

(52) U.S. Cl.
CPC .. *B66D 5/28* (2013.01); *B66D 5/14* (2013.01); *B66D 5/26* (2013.01)

(58) Field of Classification Search
CPC .............. B66D 5/14; B66D 5/26; B66D 5/28; G05G 1/30; G05G 1/44; G05G 1/445; G05G 1/46; F16D 65/22
USPC .............. 188/151 R, 152, 170; 254/375, 378, 254/379, 366; 74/478, 512
See application file for complete search history.

(56) References Cited

U.S. PATENT DOCUMENTS 3,112,820 A * 12/1963 Falk ................................ 74/512
3,302,763 A * 2/1967 Wobrock ........................ 74/512
4,185,517 A * 1/1980 Gill et al. ........................ 74/512
7,069,810 B2 7/2006 Hayashihara
8,827,378 B2 9/2014 Toyohira et al.
2006/0151265 A1* 7/2006 Honjou et al. ................ 188/170
2010/0186540 A1 7/2010 Sugiura et al.

FOREIGN PATENT DOCUMENTS

JP 2003-48689 A 2/2003
JP 2004-86567 A 3/2004
JP 2006-151167 A 6/2006
JP 2006-264569 A 10/2006
JP 2009-90933 A 4/2009

OTHER PUBLICATIONS

Japanese Office Action dated Dec. 24, 2014 (three pages).

* cited by examiner

*Primary Examiner* — Thomas J Williams
(74) *Attorney, Agent, or Firm* — Crowell & Moring LLP

(57) ABSTRACT

A winch braking device includes: a brake; a brake pedal; a reaction force-imparting element that imparts a reaction force to the brake pedal; a rotation link that rotates by interlocking with the foot operation at the brake pedal; a brake valve linked to the rotation link, that applies a secondary pressure to the brake in response to the foot operation at the brake pedal; and a tension spring, with one end thereof attached to the vehicle body at a predetermined position and another end thereof attached to the rotation link, that applies a force to the brake pedal along a direction opposite a direction of the foot operation. As the foot operation is performed at the brake pedal, the tension spring extends and a shortest distance between a rotational center of the rotation link and a central axis of the tension spring becomes smaller.

4 Claims, 12 Drawing Sheets

ENLARGED VIEW OF AREA C

WINCH BRAKING DEVICE

INCORPORATION BY REFERENCE

The disclosure of the following priority application is herein incorporated by reference: Japanese patent application No. 2012-210977 filed Sep. 25, 2012

BACKGROUND OF THE INVENTION

1. Field of the Invention

The present invention relates to a braking device for a winch installed in a crane or the like.

2. Description of Related Art

It is standard practice in the related art to use a dynamic hydraulic braking device such as that disclosed in Japanese laid open patent publication No. 2003-48689 as a braking device for a winch installed in a crane or the like, which is required to exert a significant braking force without requiring a great operating force.

The publication cited above discloses a winch braking device that includes a reaction force-imparting element providing a damping effect, which may be constituted of a viscoelastic material, disposed at a brake pedal. The winch braking device disclosed in the publication is capable of generating a stable braking force by efficiently absorbing machine vibration or shaking of the operator's hands and legs, which may occur during braking. Such a capability for stable brake force generation, in turn, makes it possible to modulate braking during half-way depressing of a brake pedal and also improve the positioning accuracy with which the vehicle comes to a stop through an inching (fine) operation.

SUMMARY OF THE INVENTION

However, there is an issue yet to be addressed with regard to the braking device disclosed in the publication in that as the characteristics of the reaction force-imparting element such as a viscoelastic member may become inhibited by the reaction characteristics of a pressure-reducing valve, which are bound to be incorporated into the characteristics of the reaction force-imparting element.

A winch braking device according to a first aspect of the present invention, comprises: a brake that is configured to brake a winch drum; a brake pedal disposed at a vehicle body so as to allow a foot operation to be performed thereat; a reaction force-imparting element that imparts a reaction force to the brake pedal; a rotation link that rotates by interlocking with the foot operation at the brake pedal; a brake valve linked to the rotation link, that applies a secondary pressure to the brake in response to the foot operation at the brake pedal; and a tension spring, with one end thereof attached to the vehicle body at a predetermined position and another end thereof attached to the rotation link, that applies a force to the brake pedal along a direction opposite a direction of the foot operation, wherein: the winch braking device is configured so that as the foot operation is performed at the brake pedal, the tension spring extends and a shortest distance between a rotational center of the rotation link and a central axis of the tension spring becomes smaller.

According to a second aspect of the present invention, in the winch braking device according to the first aspect, it is preferable that the winch braking device is configured so that uniformity is achieved in a total torque representing a sum of a brake valve reaction torque occurring as a reaction force attributable to the brake valve, which corresponds to the foot operation at the brake pedal, is applied to the rotation link, and a tension spring reaction torque occurring as a reaction force attributable to the tension spring, which corresponds to the foot operation at the brake pedal, is applied to the rotation link, by canceling out change characteristics of the brake valve reaction torque with change characteristics of the extension spring reaction torque, wherein: a brake pedal force is determined by a sum of a brake reaction force attributable to the reaction force-imparting element and a brake reaction force corresponding to the total torque.

According to a third aspect of the present invention, in the winch braking device according to the first aspect, it is preferable that the winch braking device is configured so that the tension spring reaction torque decreases as a foot operation quantity at the brake pedal increases.

According to a fourth aspect of the present invention, the winch braking device according to the first aspect may further comprise: a link mechanism that transmits a pedal force to the brake valve, wherein: the link mechanism is configured so that a rate of valve stroke increase at the brake valve rises as a foot operation quantity at the brake pedal increases.

According to a fifth aspect of the present invention, the winch braking device according to the first aspect may further comprise: a link mechanism that transmits a pedal force to the brake valve, wherein: the link mechanism is configured so that uniformity is achieved in a rate of valve stroke change at the brake valve relative to a foot operation quantity at the brake pedal.

DESCRIPTION OF PREFERRED EMBODIMENTS

The following is a description of embodiments of the winch braking device according to the present invention, given in reference to drawings.

First Embodiment

Figure 1:
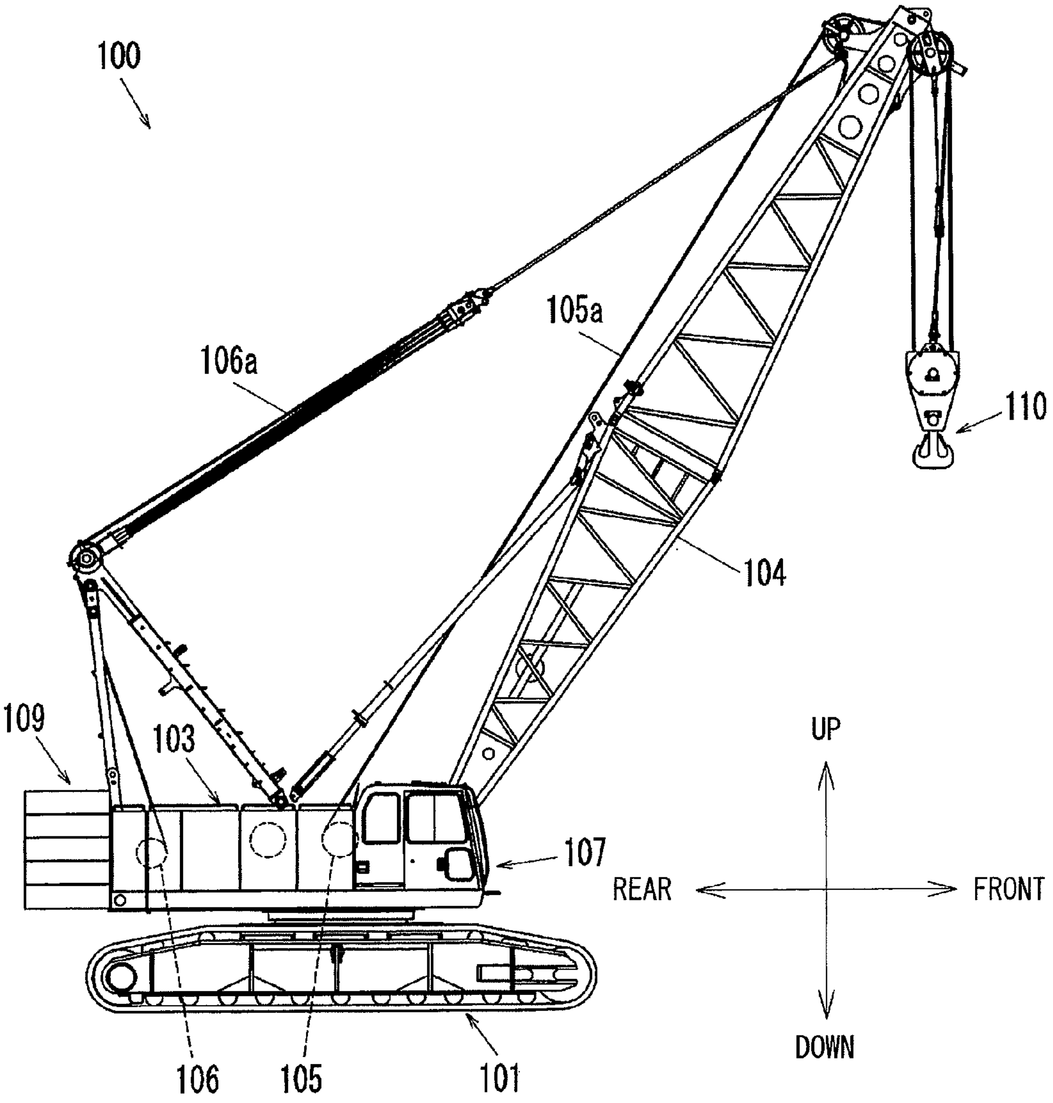
FIG. 1 presents an external view of a crane equipped with the winch braking device achieved in a first embodiment of the present invention in a side elevation.

FIG. 1 presents an external view of a crane 100 equipped with a winch braking device achieved in the first embodiment of the present invention in a side elevation. The directional terms up/down and front/rear used in the following description are defined, as indicated in the figure, in reference to the attitude of the crane shown in FIG. 1. The crane 100 includes a traveling undercarriage 101, a revolving superstructure 103 rotatably disposed upon the traveling undercarriage 101 via a revolving ring, and a boom 104 axially supported at the revolving superstructure 103 so as to be allowed to rotate. An operator's cab 107 is located at the front of the revolving superstructure 103, whereas a counterweight 109 is mounted at the rear of revolving superstructure 103. A hoisting drum 105, which is a winch drum engaged in hoisting operation, and a derricking drum 106, which is a winch drum engaged in boom derricking operation, are installed in the revolving superstructure 103.

A hoisting rope **105*a* is wound at the hoisting drum 105. As the hoisting drum 105 rotates, the hoisting rope 105*a* is either taken in or let out, thereby causing a hook 110 to be raised or lowered. A derricking rope 106*a* is wound at the derricking drum 106. As the derricking drum 106 is driven, the derricking rope 106*a* is taken in or let out, resulting in a derricking movement of the boom 104. The hoisting drum 105 is caused to rotate as a hoisting hydraulic motor 150 (not shown in FIG. 1, see FIG. 2) is driven, whereas the derricking drum 106** is caused to rotate as a derricking hydraulic motor (not shown) is driven.

Figure 2:
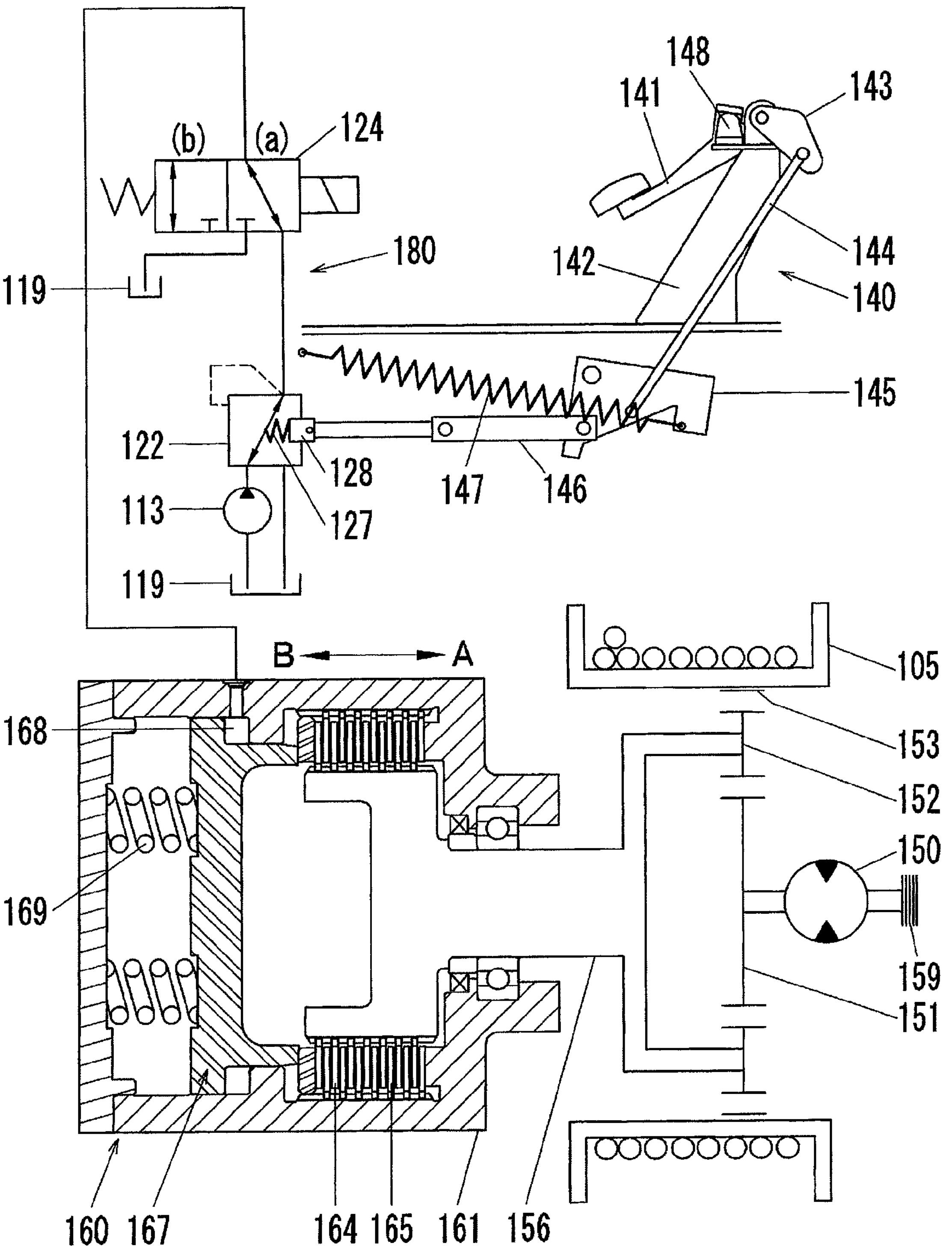
FIG. 2 is a hydraulic circuit diagram showing the structure of the winch braking device achieved in the first embodiment of the present invention.

FIG. 2 is a hydraulic circuit diagram showing the structure of the winch braking device achieved in the first embodiment of the present invention. The hydraulic motor 150 rotates as drive pressure oil is supplied thereto via a hydraulic pump (not shown). A multi-disk motor brake 159, which applies a brake to a rotating motor output shaft, is mounted at the hydraulic motor 150. The rotation of the hydraulic motor 150 is transmitted to the hoisting drum (winch drum) 105 via a planetary speed reducer system configured with a sun gear 151, a planetary gear 152 and a ring gear 153. The planetary gear 152 is supported by a carrier shaft 156. The carrier shaft 156 extends through a side wall of a brake case 161 and reaches inside the brake case 161. The winch braking device inhibits rotation of the hoisting drum 105 by applying a brake on the carrier shaft 156.

The braking device comprises a negative type wet multi-disk brake 160, a brake circuit 180 that provides a brake control pressure to the brake 160, and a brake pedal device 140 at which an operator inputs a braking command.

The brake 160 includes a plurality of inner disks 164, a plurality of outer disks 165, a brake disk 167 and a spring 169, all housed within the brake case 161. The inner disks 164 are engaged with the carrier shaft 156 through spline jointing so that they are allowed to move along the axial direction, and thus, the inner disks 164 and the carrier shaft 156 are able to rotate as one. The outer disks 165 are engaged at the inner circumferential surface of the brake case 161 through spline jointing so that they are allowed to move along the axial direction.

The outer disks 165 and the inner disks 164 are disposed so as to form an alternating pattern along the axial direction. On one side of the axis of the carrier shaft 156, located at an end of the carrier shaft 156, the brake disk 167 is disposed. The spring 169 is disposed between the brake disk 167 and the brake case 161.

A force imparted from the spring 169 is applied to the brake disk 167 so as to press the inner disks 164 against the outer disks 165 and keep them in contact with each other at all times. Inside the brake case 161, the brake disk 167, an oil chamber 168 and the spring 169 form a brake cylinder with the brake disk 167 functioning as the piston thereof. When no hydraulic force is applied to the oil chamber 168, the brake disk 167 is pushed along the direction indicated by A in the figure by the force imparted from the spring 169. In this state, a friction force is applied to the surfaces of the inner disks 164, thereby disallowing rotation of the inner disks 164.

As pressure oil is supplied to the oil chamber 168 via the brake circuit 180, a hydraulic force (a brake release pressure), which counters the force imparted from the spring 169, is applied to the brake disk 167 and, as a result, the brake disk 167 is pushed along the direction indicated by B in the figure. As a result, the pressure, having kept the inner disks 164 and the outer disks 165 in contact with each other, is released and thus, the carrier shaft 156 is allowed to rotate.

The brake circuit 180 is formed by connecting a pilot pump 113, a brake control valve 122 and an electromagnetic switching valve 124 in series. The brake control valve 122, which is a pressure reducing valve, includes a push rod 128 that moves with a stroke, the extent of which corresponds to the extent to which the brake pedal device 140 is operated (operation quantity). The secondary pressure of the pressure oil passing through the brake control valve 122, i.e., the brake release pressure, is further reduced as the push rod 128 is pushed into the brake control valve 122 by a greater extent.

The electromagnetic switching valve 124 is switched through an operation of free-fall switch (not shown). As the free-fall switch is turned on, the electromagnetic switching valve 124 is switched to a position (a), whereas it is switched to a position (b) in response to an off operation of the free-fall switch. When the electromagnetic switching valve 124 is set at the position (a), pressure oil (dynamic hydraulic pressure) can be supplied into the oil chamber 168 via the pilot pump 113, whereas a reservoir pressure is applied to the oil chamber 168 as long as it is set at the position (b).

A parallel link mechanism, which transmits a pedal force generated as the operator steps on a brake pedal 141 to the brake control valve 122, is connected to the push rod 128 at the brake control valve 122. The push rod 128 makes a stroking movement by interlocking with a foot operation at the brake pedal 141 and the extent of depressurization at the brake control valve 122 is determined in correspondence to the stroke quantity. In other words, as the operator steps on the brake pedal 141, a secondary pressure corresponding to the foot operation quantity is applied to the brake 160, resulting in generation of a braking force corresponding to the operation quantity.

Figure 3:
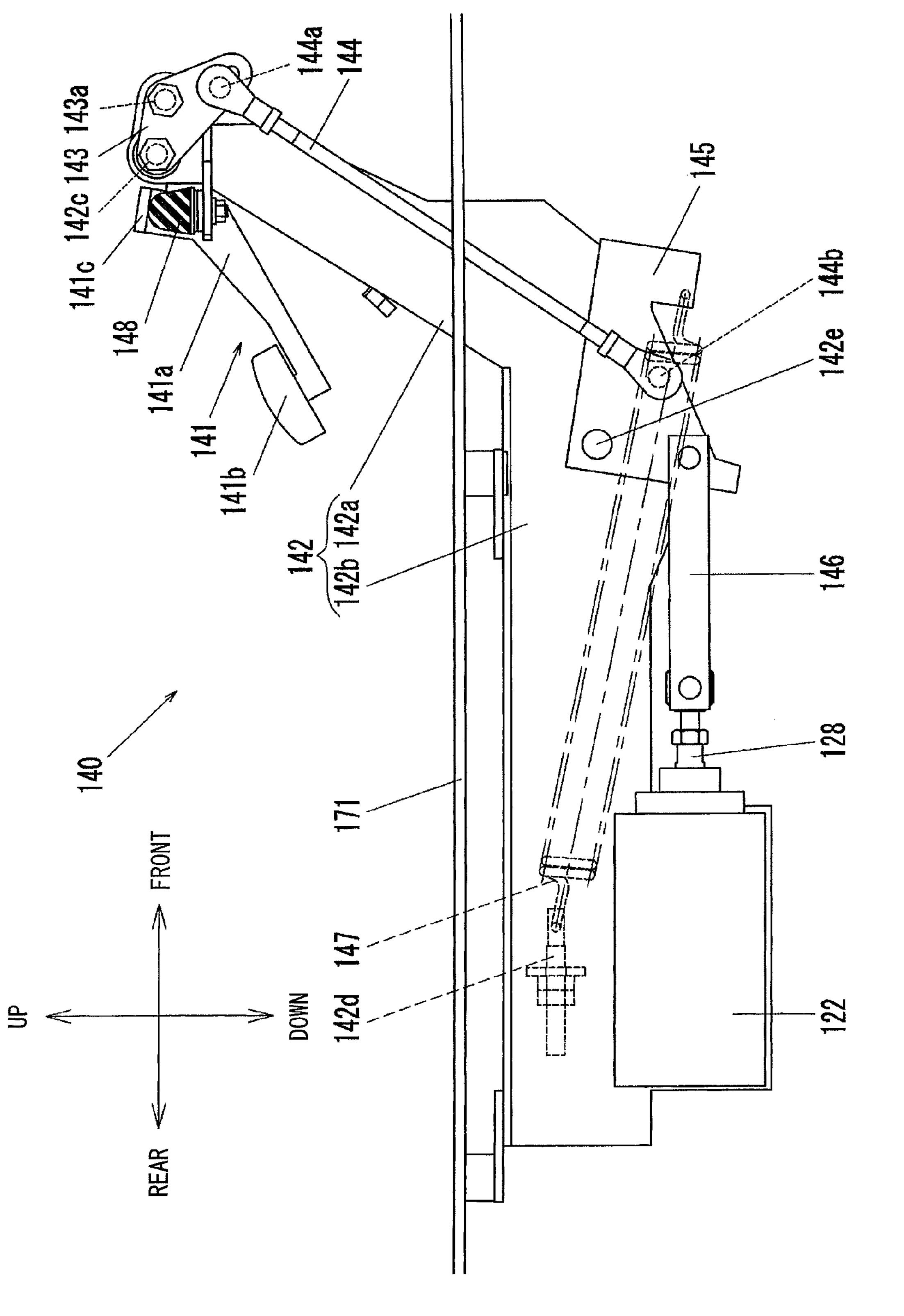
FIG. 3 shows conditions observed before the operator steps on the brake pedal (non-operating state) in a schematic side elevation.
Figure 4:
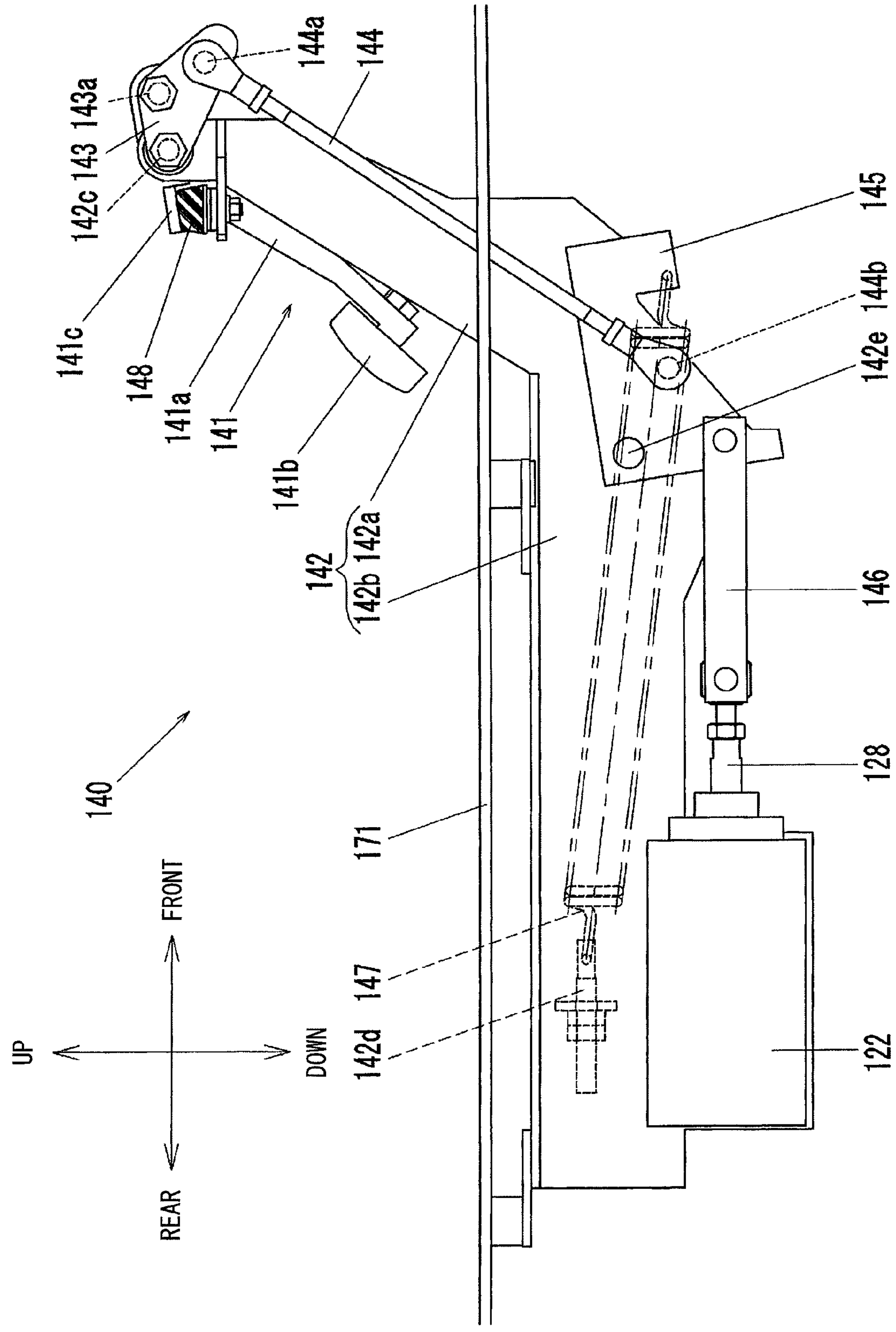
FIG. 4 shows conditions observed after the operator steps on the brake pedal (maximum foot operating state) in a schematic side elevation.

In reference to FIGS. 3 through 6B, the structure of the brake pedal device 140 will be described. FIG. 3 shows conditions observed in a pre-foot operation state (non-operating state) in a schematic side elevation, and FIG. 4 shows conditions observed in a post-foot operation state (maximum foot operation state) after the operator steps on the brake pedal in a schematic side elevation. The directional terms "up/down" and "front/rear" used in the following description are defined as indicated in the figures.

As FIGS. 3 and 4 show, the brake pedal device 140 comprises the brake pedal 141, a supporting member 142, a linking member 143, a link rod 144, a rotation link 145, a horizontal rod 146, a reset spring 147 and a rubber member 148.

The supporting member 142 includes a body fixed portion 142*b* that is fixed to the vehicle body of the crane and a sloping member 142*a* that extends diagonally from the front end of the body fixed portion 142*b* along an upward/frontward direction. The body fixed portion 142*b*, located under a floor surface 171 of the operator's cab 107, ranges along the floor surface 171 and is fixed to the body frame (not shown) via fastening members (not shown) such as bolts. The sloping member 142*a* projects out toward the upper front from the floor surface 171 along a diagonal direction.

A rotating shaft 142*c* is disposed at the upper end of the sloping member 142*a*. A spring holding member 142*d* is fixed at a position near the rear end of the body fixed portion 142*b*, whereas a rotating shaft 142*e* is disposed near the front end of the body fixed portion 142*b*.

The brake pedal 141 includes a lever portion 141*a* and a foot-grip portion 141*b* located at the rear end of the lever portion 141*a*. The brake pedal 141 is disposed at the vehicle body of the crane so as to allow a foot operation to be performed thereat. A fixed shaft 143*a* is disposed at the front end of the lever portion 141*a*. The brake pedal 141 is rotatably linked to the rotating shaft 142*c* at the front end of the lever portion 141*a*.

The linking member 143 is a disk or plate member assuming a substantially triangular shape. It is rotatably linked to the rotating shaft 142*c* located at the upper end of the sloping member 142*a* and is also fixed to the brake pedal 141 via the fixed shaft 143*a* disposed at the front end of the lever portion 141*a*. Thus, the brake pedal 141 and the linking member 143 are allowed to rotate as one with the rotating shaft 142*e* forming the fulcrum of rotation.

The link rod 144 is a rod-shaped member with a linking shaft 144*a* disposed at one end thereof rotatably linked with the linking member 143 and a linking shaft 144*b* disposed at the other end thereof rotatably linked with the rotation link 145. The upper end portion of the rotation link 145 located on the rear side thereof is rotatably linked with the rotating shaft 142*e* and the linking shaft 144*b* of the link rod 144 is linked at a substantial center of the rotation link 145 located on a lower side thereof.

The reset spring 147 is a helical tension spring with one end thereof attached to the spring holding member 142*d* and the other end thereof attached to the front end of the rotation link 145. The reset spring 147 is mounted in a state in which it is extended by a predetermined extent relative to its natural length, and constantly imparts a force along a direction opposite from the direction of the foot operation at the brake pedal 141, regardless of whether or not the brake pedal device 140 is being operated.

One end of the horizontal rod 146 is rotatably linked to the rotation link 145 at a position in the vicinity of a point directly under the rotational center O (see FIG. 5) of the rotation link 145, whereas the other end of the horizontal rod 146 is rotatably linked to the push rod 128 at the brake control valve 122. The central axis of the horizontal rod 146 and the central axes of the push rod 128 and a valve spring 127 (see FIG. 7) are set substantially in alignment with one another. Thus, even as the rotation link 145 rotates, the horizontal rod 146 and the push rod 128 are allowed to move substantially along the horizontal direction.

In the vicinity of the upper end of the sloping member 142*a*, a rubber holding plate, which holds the rubber member 148, is disposed. The rubber member 148 is fixed onto the rubber holding plate. At the top of the lever portion 141*a* of the brake pedal 141, an engaging plate 141*c*, which is to engage with the rubber member 148, is disposed.

As the operator steps on the brake pedal 141, the linking member 143 rotates as one with the brake pedal 141, thereby pulling up the link rod 144 diagonally forward. The rotation link 145, interlocking with the link rod 144, rotates along the counterclockwise direction in FIGS. 3 and 4, causing a frontward movement of the horizontal rod 146 and the push rod 128.

In response to the foot operation at the brake pedal 141, the engaging plate 141*c* compresses the rubber member 148, as illustrated in FIG. 4. The extent to which the rubber member 148 is compressed increases as the operation quantity at the brake pedal 141 increases. Thus, during the foot operation at the brake pedal 141, a reaction force corresponding to the extent to which the rubber member 148 is compressed is applied to the brake pedal 141.

The operation of the winch braking device achieved in the embodiment will be described next.

(1) Free-Fall Switch: Off

When the free-fall switch (not shown) is in the OFF state, the electromagnetic switching valve 124 shown in FIG. 2 is set at the position (b), setting the oil chamber 168 in the brake case 161 in communication with a reservoir 119. In this state, no brake release pressure is applied to the oil chamber 168 from the pilot pump 113 and, as a result, the brake disk 167 is pushed toward A in the figure by the force imparted from the spring 169. The inner disks 164 and the outer disks 165 are thus pressed into contact with each other, and with the rotation of the inner disks 164 disallowed, the braking device enters a brake engaged state.

Once the braking device is engaged as described above, the carrier shaft 156 is no longer allowed to rotate and thus, the rotation of the hydraulic motor 150 can be transmitted to the hoisting drum 105 via the sun gear 151, the planetary gear 152 and the ring gear 153. If the operator operates an operation lever (not shown) so as to supply pressure oil from a hydraulic pump (not shown) to the hydraulic motor 150 in this state, the hydraulic motor 150 starts to rotate to drive the hoisting drum 105 along the lifting or lowering direction and, as a result, the load attached to the hook 110 can be moved up/down. The rotation of the hydraulic motor 150 can be stopped via the multi-disk motor brake 159.

(2) Free-Fall Switch: On

While the rotation of the hydraulic motor 150 is stopped and the attached load is suspended, the electromagnetic switching valve 124 shown in FIG. 2 can be switched to the position (a) by turning on the free-fall switch (not shown). As the electromagnetic switching valve 124 is switched to the position (a), pressure oil from the pilot pump 113 is applied to the oil chamber 168 via the brake control valve 122 and the electromagnetic switching valve 124. Thus, the brake disk 167 is pushed toward B in the figure by the hydraulic force (brake release pressure) provided via the pilot pump 113, thereby causing contraction of the spring 169. This, in turn, releases the pressure that has pressed the inner disks 164 and the outer disks 165 in contact with each other, and thus, the braking device enters a brake released state, since the inner disks 164 are now allowed to rotate. When the braking device is in the released state, the carrier shaft 156 is allowed to rotate, and under such conditions, the hoisting drum 105 is able to rotate freely due to the weight of the suspended load, thereby making it possible to lower the suspended load in free-fall.

If the operator steps on the brake pedal 141 while the suspended load is descending in free-fall, the push rod 128 at the brake control valve 122 moves frontward (see FIG. 4) in correspondence to the operation quantity at the brake pedal 141. Thus, the pressure oil from the pilot pump 113 is depressurized at the brake control valve 122, resulting in a decrease in the hydraulic force applied to the oil chamber 168. Once the force of the pressure oil pushing the brake disk 167 toward B in the figure becomes less than the force imparted from the spring 169 pushing the brake disk 167 toward A in the figure, the brake disk 167 becomes pushed toward A in the figure. As a result, the inner disks 164 and the outer disks 165 are pressed against each other in contact, which disallows rotation of the inner disks 164 and thus, the braking device enters a brake engaged state with a brake applied from the brake 160 on the hoisting drum 105. Consequently, the free-falling load can be stopped.

Figure 5:
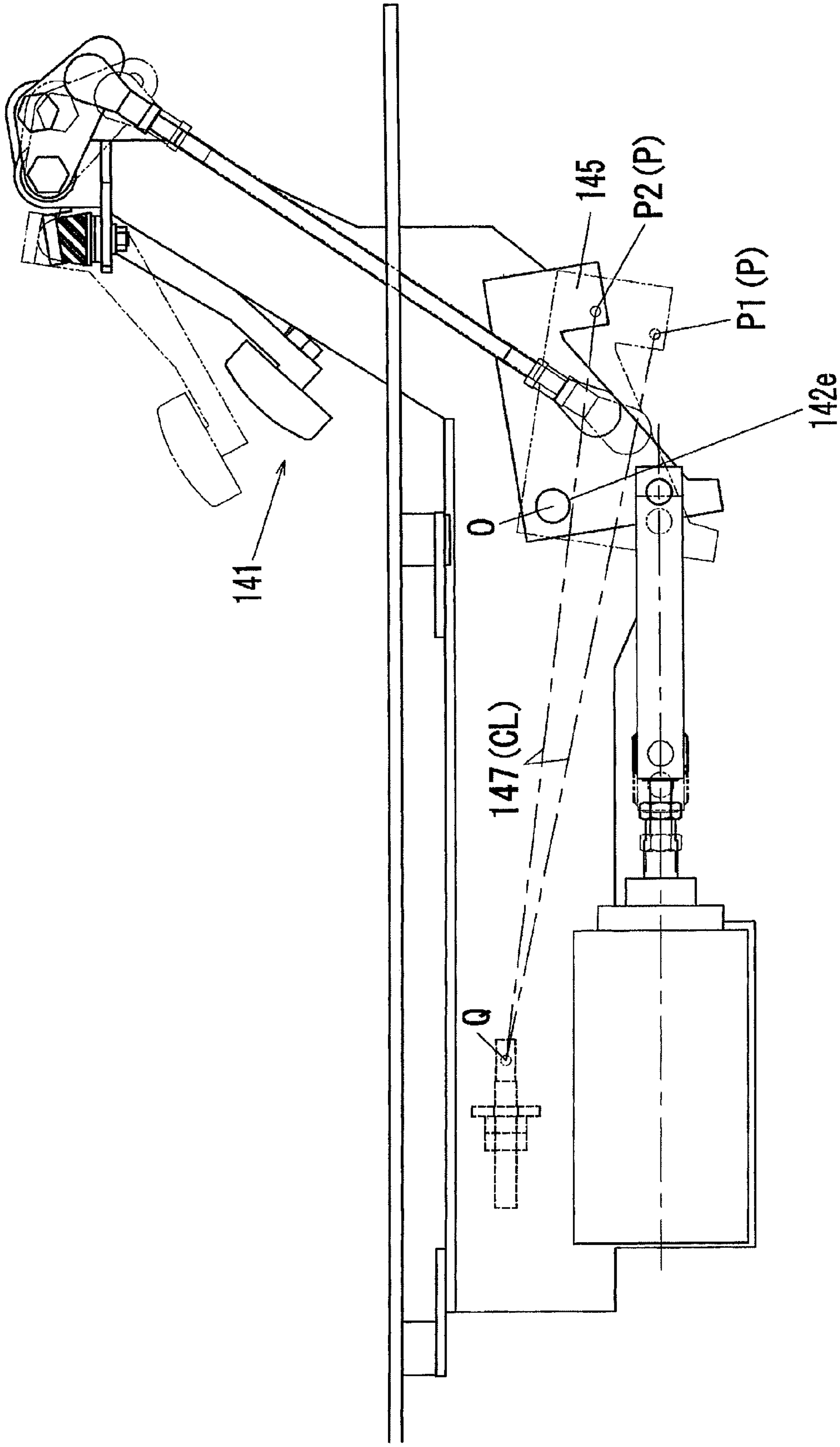
FIG. 5 illustrates conditions observed before and after a foot operation of the brake pedal in a schematic side elevation.
Figure 6A:
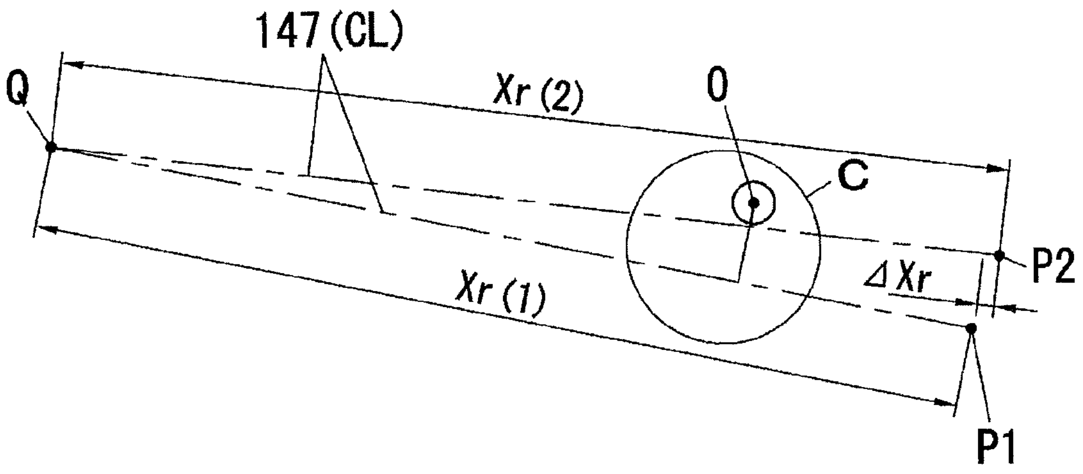
FIGS. 6A and 6B illustrate the relationship between the spring force imparted from the reset spring and the moment arm length.
Figure 6B:
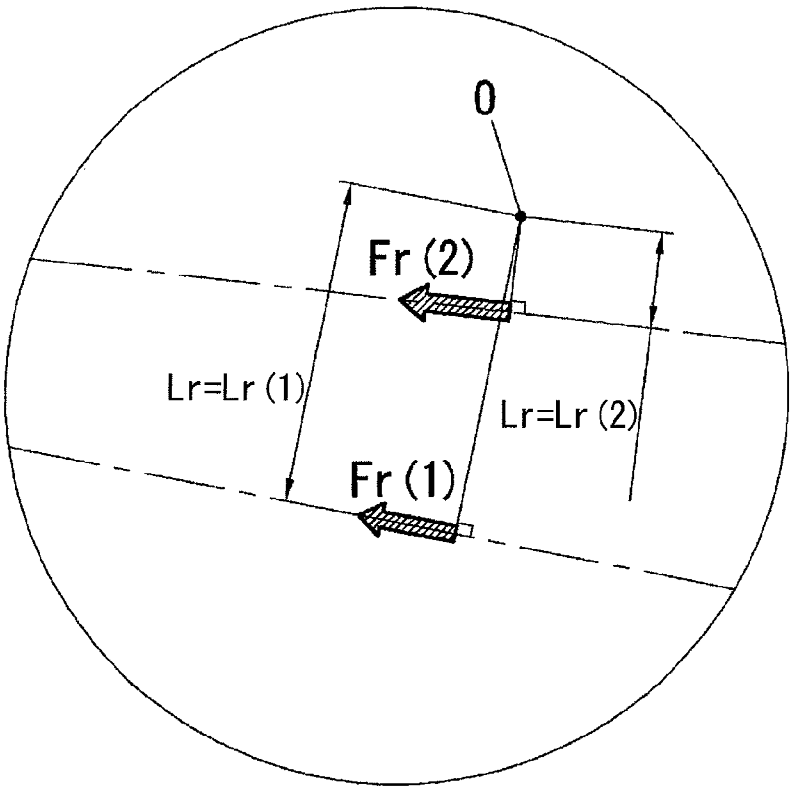

FIG. 5 shows the conditions observed before and after the foot operation of the brake pedal 141 in a schematic side elevation. FIGS. 6A and 6B illustrate the relationship between the spring force Fr of the reset spring 147 and a moment arm length Lr in schematic diagrams indicating the relationship between the rotational center O of the rotation link 145 and the mounting positions P and Q of the reset spring. For purposes of illustration clarity, FIG. 5 and FIGS. 6A and 6B simply show the central axis CL of the reset spring 147 and do not include any illustration pertaining to the external appearance of the spring.

It is to be noted that Q, P1 and P2 in FIG. 5 and FIGS. 6A and 6B respectively denote the fixed position at which one end of the reset spring 147 is mounted, a first position assumed for the other end of the reset spring 147, i.e., the mounting position at the other end, when no foot operation is performed at the brake pedal 141, and a second position assumed for the other end of the reset spring 147, i.e., the mounting position at the other end, when the operator has stepped on the brake pedal 141 to the maximum extent.

The fixed position Q and the mounting position P relative to the rotational center O is determined for the brake pedal device 140 achieved in the embodiment so that as a foot operation is performed at the brake pedal 141, the reset spring 147 extends and also the shortest distance between the rotational center O of the rotation link 145 and the central axis CL of the reset spring 147, i.e., the moment arm length Lr, is reduced.

As FIG. 6A indicates, the reset spring 147 assumes a length Xr(1) in the non-operating state and the reset spring 147 assumes a length Xr(2) greater than the length Xr(1) in the maximum foot operation state. The overall length of the reset spring 147 following the foot operation is greater than that prior to the foot operation by ΔXr (ΔXr=Xr(2)−Xr(1), Xr(1) <(Xr(2)). While the brake pedal 141 shifts from the non-operating state to the maximum foot operation state, the reset spring 147 gradually extends as the foot operation quantity at the brake pedal 141 increases.

As FIG. 6B indicates, the moment arm length Lr in the non-operating state is Lr(1), whereas the moment arm length Lr in the maximum foot operation state is Lr(2). The moment arm length Lr following the foot operation is less than that prior to the foot operation by ΔLr (ΔLr=Lr(1)−Lr(2), Lr(1) >Lr(2)). While the brake pedal 141 shifts from the non-operating state to the maximum foot operation state, the moment arm length Lr gradually decreases as the foot operation quantity at the brake pedal 141 increases.

Figure 7A:
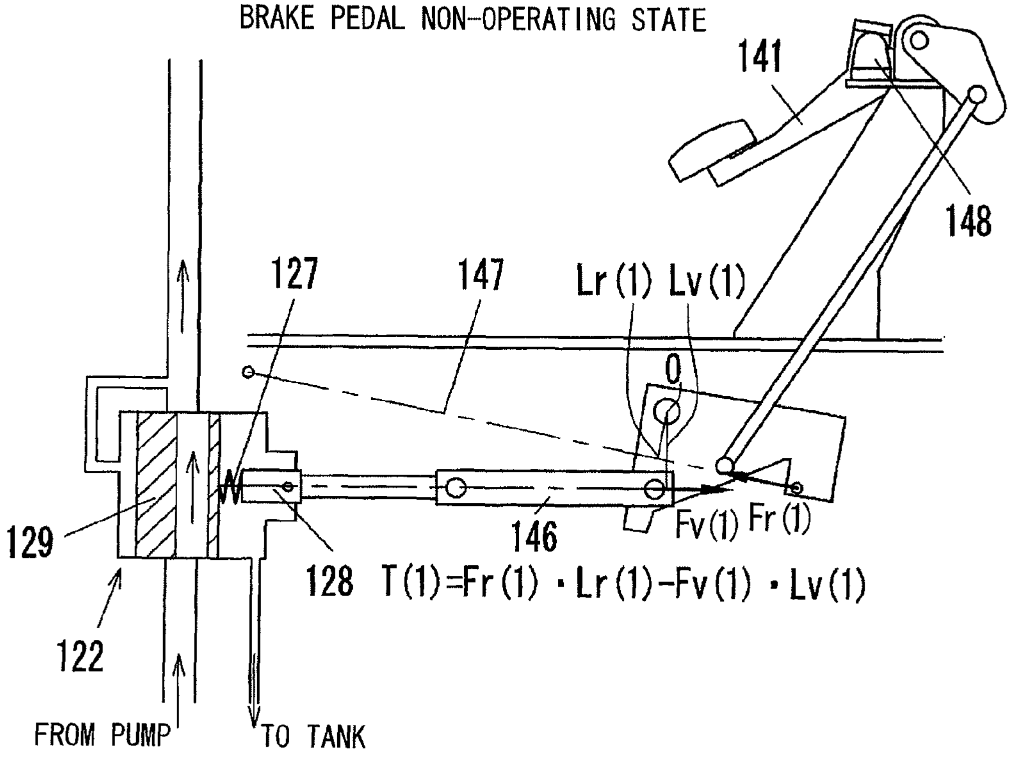
FIGS. 7A and 7B illustrate the relationship between the reaction torque applied to the rotation link via the reset spring and the reactive torque applied to the rotation link via the brake control valve.
Figure 7B:
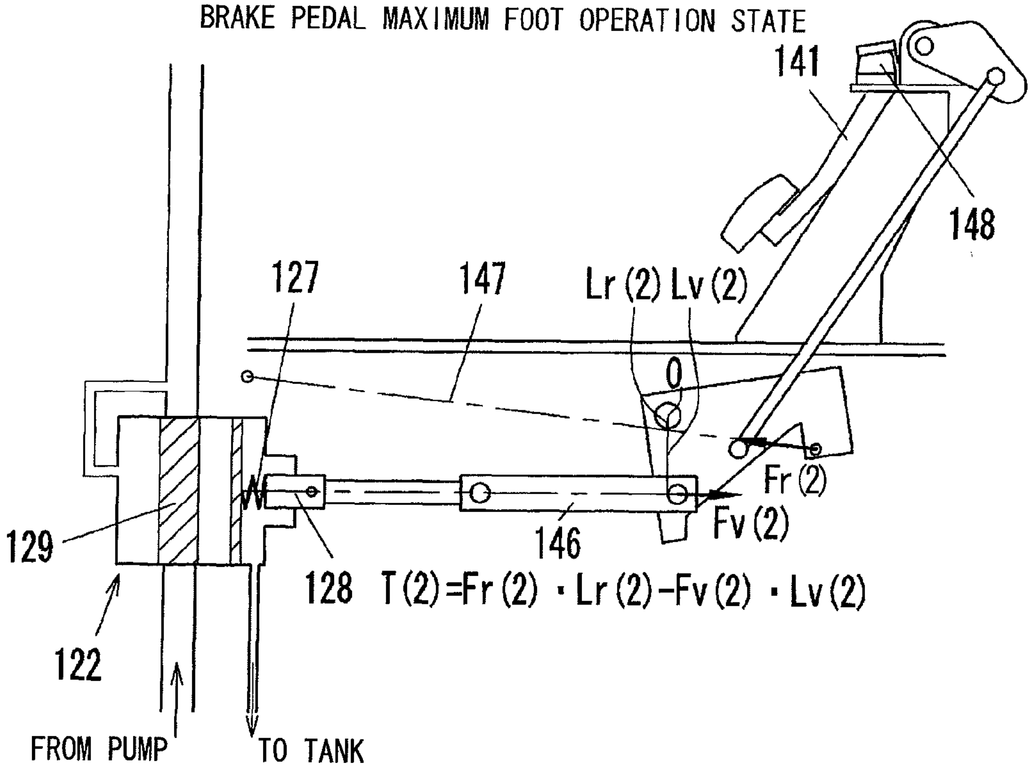

FIGS. 7A and 7B illustrate the relationship between a reaction torque Tr applied to the rotation link 145 via the reset spring 147 and a reaction torque Tv applied to the rotation link 145 via the brake control valve 122. It is to be noted that the reaction torque Tr attributable to the reset spring 147 is generated as the reaction force of the reset spring 147 is applied to the rotation link 145 and that the reaction torque Tv attributable to the brake control valve 122 is generated as the reaction force of the brake control valve 122 is applied to the rotation link 145. FIG. 7A shows the conditions observed when the brake pedal 141 is in the non-operating state, whereas FIG. 7B shows the conditions observed when the brake pedal 141 is in the maximum foot operation state.

The spring force Fr imparted from the reset spring 147 may be calculated as expressed in (1) below, with Kr representing a spring constant of the reset spring 147 and Xr0 representing the natural length of the reset spring 147. n is an integer taking on a value of 1 or 2. When n=1, the brake pedal is in the non-operating state, whereas when n=2, the brake pedal is in the maximum foot operation state.

$$Fr(n)=Kr\times(Xr(n)-Xr0)(n=1,2) \quad (1)$$

In conjunction with the spring force calculated as expressed above, the torque Tr(n) at the rotation link 145 attributable to the reset spring 147 can be calculated as expressed in (2) below, with Lr representing the shortest distance between the rotational center O of the rotation link 145 and the central axis CL of the reset spring 147, i.e., the length of the moment arm represented by the perpendicular line connecting the rotational center O and the line of action of the reaction force Fr.

$$Tr(n)=Fr(n)\times Lr(n)(n=1,2) \quad (2)$$

FIGS. 7A and 7B show the structure of the brake control valve (pressure reducing valve) 122 in simplified illustrations. The brake control valve 122 includes a spool 129, a helical compression spring (hereafter referred to as a valve spring 127) used for purposes of pressure setting and the push rod 128. In the pedal non-operating state, the push rod 128 is pressed in the brake control valve 122 and thus, the spool 129 is held on the left side in the figures. The pressure of the pressure oil, lowered via the brake control valve 122, which is acting on the spool 129, is in balance with the spring force imparted from the valve spring 127. In this state, the spring force Fv of the valve spring 127 is acting on the push rod 128. The spring force Fv of the valve spring 127 is determined based upon the stroke quantity of the push rod 128.

The spring force Fv of the valve spring 127 may be calculated as expressed in (3) below, with Kv representing the spring constant of the valve spring 127, Xv(n) representing the length of the valve spring 127 and Xv0 representing the natural length of the valve spring 127.

$$Fv(n)=Kv\times(Xv(n)-Xv0)(n=1,2) \quad (3)$$

In conjunction with the spring force calculated as expressed above, the torque Tv(n) at the rotation link 145 attributable to the valve spring 127 can be calculated as expressed in (4) below with Lv representing the shortest distance between the rotational center O of the rotation link 145 and the central axis of the valve spring 127, i.e., the length of the moment arm represented by the perpendicular line connecting the rotational center O and the line of action of the reaction force Fv.

$$Tv(n)=Fv(n)Lv(n)(n=1,2) \quad (4)$$

Since the torque Tr(n) and the torque Tv(n) act along opposite directions, the total torque T(n) applied to the rotation link 145 is calculated as expressed in (5) below.

$$T(n)=Tr(n)-Tv(n)(n=1,2) \quad (5)$$

Accordingly, the total torque T(1) generated when no foot operation is being performed at the brake pedal 141, as shown in FIG. 7A, is calculated as expressed in (6) below.

$$T(1)=Fr(1)\cdot Lr(1)-Fv(1)\cdot Lv(1) \quad (6)$$

Fr(1) represents the spring force imparted from the reset spring 147, Lr(1) represents the length of the moment arm extending between the reset spring 147 and the rotation link 145, Fv(1) represents the spring force imparted from the valve spring 127 and Lv(1) represents the length of the moment arm extending between the valve spring 127 and the rotation link 145.

In addition, the total torque T(2) generated when the brake pedal 141 is in the maximum foot operation state, as shown in FIG. 7B, is calculated as expressed in (7) below.

$$T(2)=Fr(2)\cdot Lr(2)-Fv(2)\cdot Lv(2) \quad (7)$$

Fr(2) represents the spring force imparted from the reset spring 147, Lr(2) represents the length of the moment arm extending between the reset spring 147 and the rotation link 145, Fv(2) represents the spring force imparted from the valve spring 127 and Lv(2) represents the length of the moment arm extending between the valve spring 127 and the rotation link 145.

Figure 8:
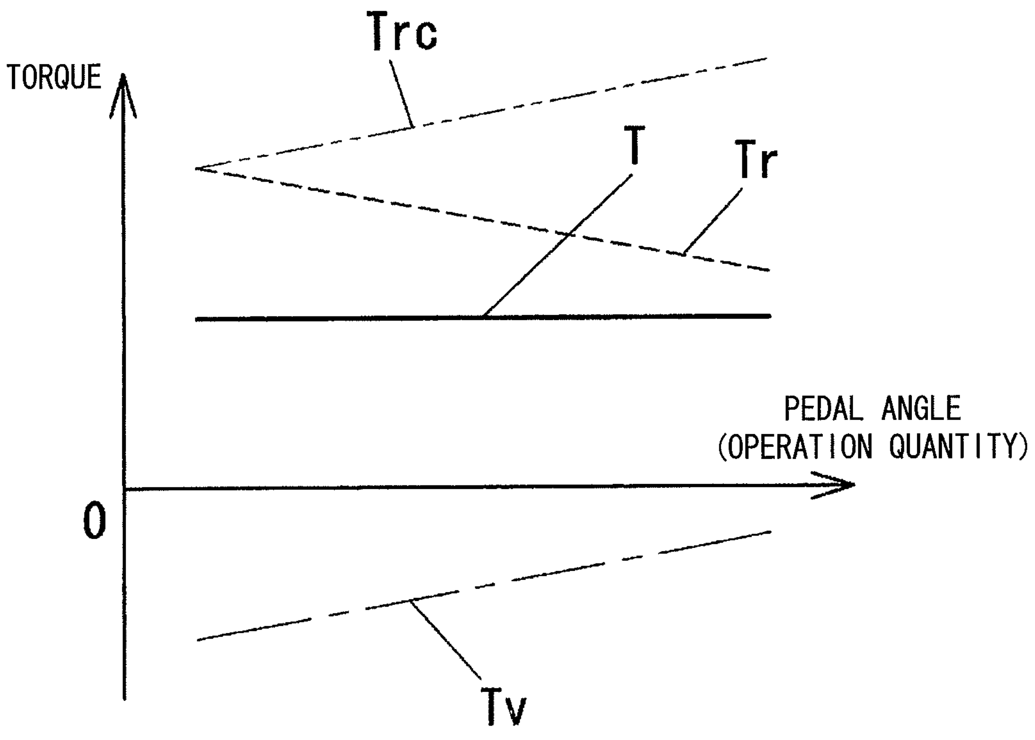
FIG. 8 indicates the relationship between the brake pedal angle and the torque.

FIG. 8 indicates the relationship between the pedal angle (pedal operation quantity) at the brake pedal 141 and the torque. It is to be noted that FIG. 8 provides a schematic representation of characteristics achieving ideal values and that the characteristics of the various members constituting the brake pedal device 140 and the positional arrangement with which they are disposed are determined so as to achieve maximum uniformity for the total torque T.

(A) The brake pedal device 140 in the embodiment is structured so that as the reset spring 147 extends further, the moment arm length Lr becomes smaller. This means that as a greater spring force Fr is exerted through a foot operation, the reaction torque Tr attributable to the reset spring 147 can be reduced.

(B) In addition, one end of the horizontal rod 146 is linked at a position in the vicinity of a point directly under the rotational center O and the horizontal rod 146 and the push rod 128 are allowed to move substantially along the horizontal direction, so as to ensure that only a small change occurs in the moment arm length Lv in the brake pedal device 140 achieved in the embodiment. The reaction torque Tv attributable to the brake control valve 122 is thus allowed to increase gently as the foot operation quantity increases.

As rationalized in (A) and (B) above, uniformity in the total torque T(n) can be achieved by canceling out the change characteristics of the reaction torque Tv attributable to the brake control valve 122, which corresponds to the pedal operation quantity, with the change characteristics of the reaction torque Tr attributable to the reset spring 147, which also corresponds to the pedal operation quantity.

Figure 9:
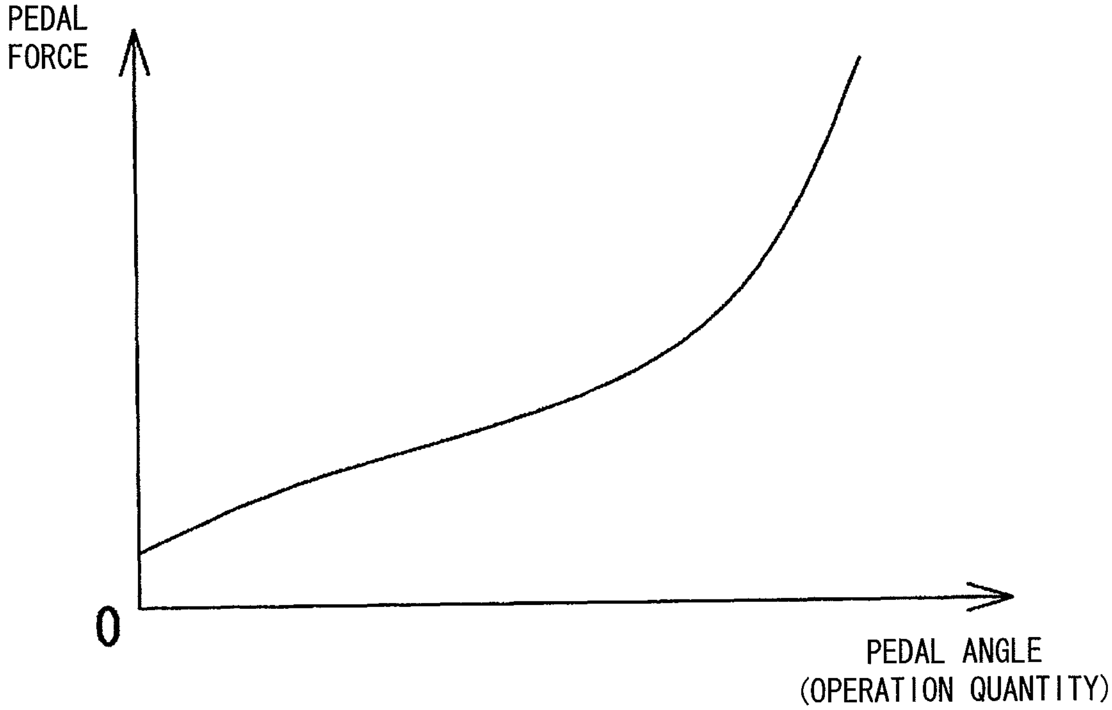
FIG. 9 indicates the relationship between the brake pedal angle and the brake pedal force.

The brake pedal force relative to the pedal operation quantity (pedal stroke) is determined by the sum of the brake reaction force attributable to the total torque T calculated by combining Tr and Tv, and the brake reaction force that corresponds to the viscoelastic characteristics of the rubber member 148. In the embodiment, the total torque T is sustained at a constant level relative to the pedal operation quantity, as explained earlier. This means that the brake pedal force relative to the pedal operation quantity changes depending upon the viscoelastic characteristics of the rubber member 148. Thus, characteristics such as those indicated in FIG. 9, whereby the pedal force increases as the foot operation quantity increases and the reaction force rises abruptly partway through the operation, can be achieved with ease.

Figure 10A:
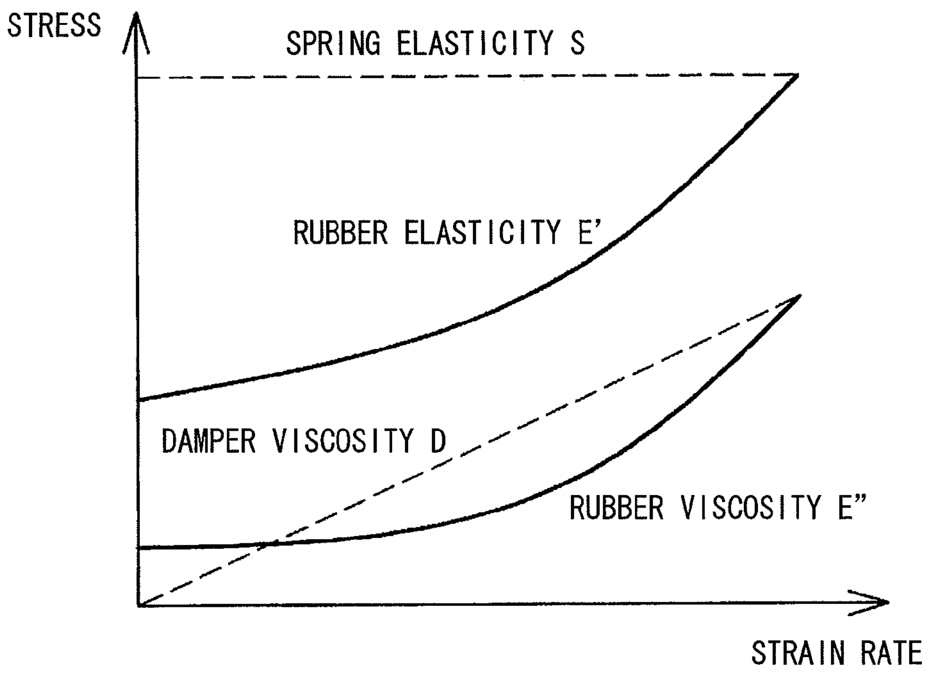
FIGS. 10A and 10B indicate the viscoelastic characteristics of the rubber member.
Figure 10B:
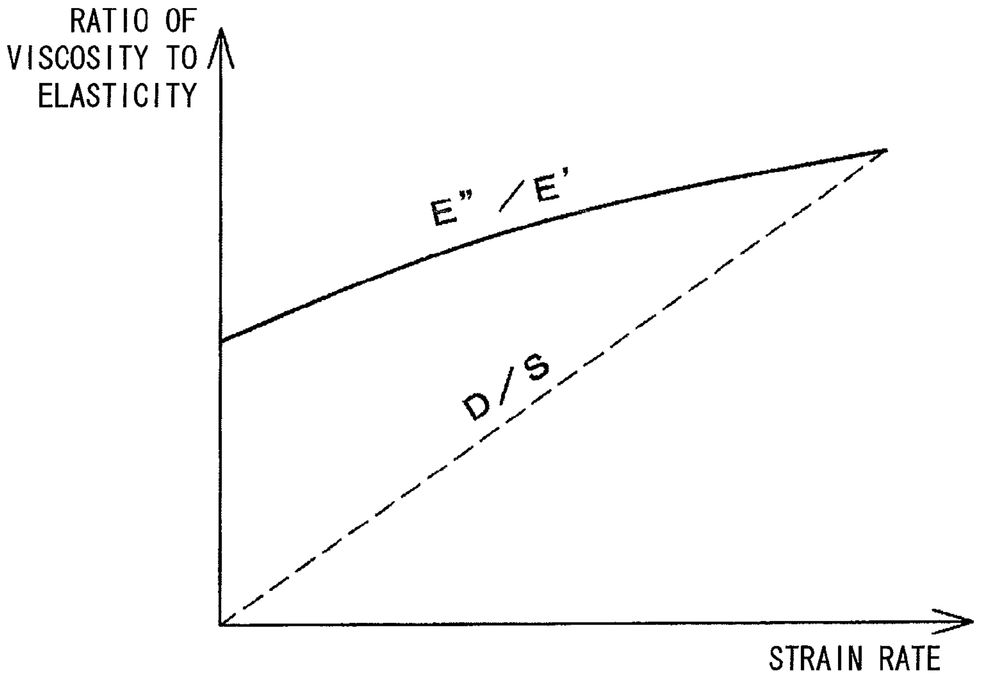

The rubber member 148 used in the embodiment demonstrates viscoelastic characteristics indicated in FIGS. 10A and 10B. FIGS. 10A and 10B illustrate the viscoelastic characteristics (elasticity E' and viscosity E") of the rubber member 148. FIG. 10A provides a diagram indicating the relationship between the stress and the strain rate, whereas FIG. 10B provides a diagram indicating the relationship between the strain rate and the viscosity/elasticity ratio. FIGS. 10A and 10B also provide sample data pertaining to spring elasticity characteristics S and damping viscosity characteristics D to be compared with the viscoelastic characteristics of the rubber member 148.

As FIGS. 10A and 10B indicate, the rubber member 148 used as a reaction force-imparting element assumes a damping range over which the damping force does not change greatly even as the strain rate changes and also assures desirable elasticity. The damping characteristics of the rubber member 148 used in the embodiment are less readily affected by the rate compared to the damping characteristics of the spring/damper combination, and good pedal operability is thus assured in the embodiment. In addition, it is ensured in the embodiment that the characteristics of such a reaction force-imparting element are not inhibited by the reaction forces attributable to the reset spring 147 and the brake control valve 122. Namely, the reaction force-imparting element in the embodiment is allowed to effectively manifest the desired characteristics.

The characteristics of a reaction torque Trc attributable to a reset spring in a brake pedal device in a comparison example are indicated with a 2-point chain line in FIG. 8. As the pedal operation quantity increases at the brake pedal device in the comparison example, the reaction torque Trc attributable to the reset spring 147 increases and thus, the reaction torque Trc attributable to the reset spring 147 is bound to greatly affect the reaction force to be imparted to the brake pedal 141, which, in turn, will result in a failure to allow the design characteristics of the rubber member 148 to manifest effectively.

The following advantages are achieved through the first embodiment described above.

(1) The brake pedal device 140 is structured so that as a foot operation is performed at the brake pedal 141, the reset spring 147 extends and the shortest distance between the rotational center O of rotation link 145 and the central axis CL of the reset spring 147, i.e., the moment arm length Lr, becomes smaller. This structure allows the rubber member 148 functioning as a reaction force-imparting element to manifest its desired viscoelastic characteristics in an effective manner, which, in turn, makes it possible to improve the operability of the brake pedal 141.

(2) The horizontal rod 146 rotatably linked at a position in the vicinity of a point directly under the rotational center O of the rotation link 145 is allowed to move substantially along the horizontal direction. In addition, the central axes of the push rod 128 and the valve spring 127 are set substantially in alignment with the central axis of the horizontal rod 146. As a result, the moment arm length Lv of the moment arm extending between the valve spring 127 and the rotation link 145 does not change greatly even as the operation quantity changes, thereby making it possible to cancel out the change characteristics of the reaction torque Tv attributable to the brake control valve 122 with the change characteristics of the reaction torque Tr attributable to the reset spring 147 with better ease and to achieve uniformity in the total torque T.

Second Embodiment

Figure 11:
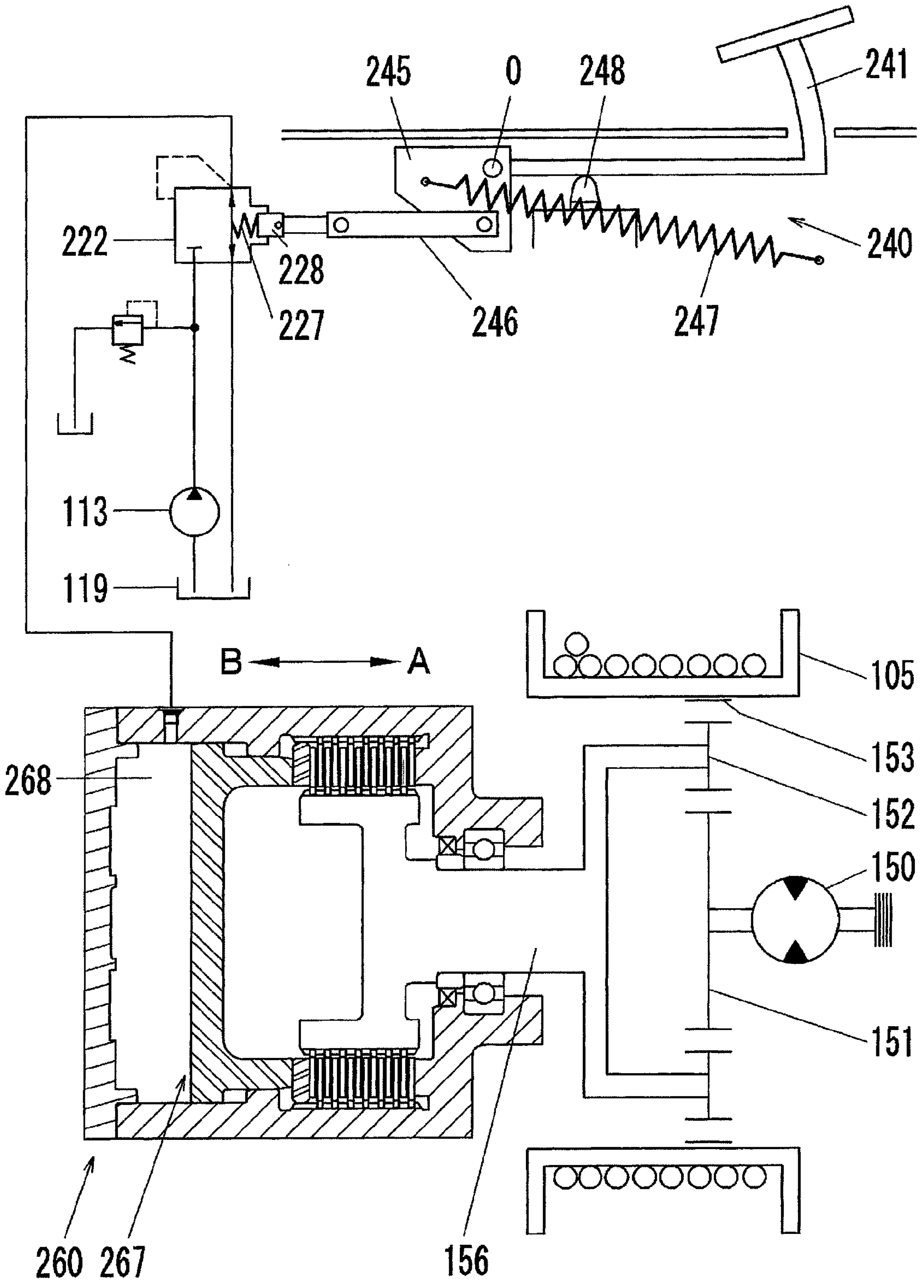
FIG. 11 is a hydraulic circuit diagram showing the structure of the winch braking device achieved in a second embodiment of the present invention.

In reference to FIG. 11, the winch braking device achieved in the second embodiment will be described. FIG. 11 is a hydraulic circuit diagram showing the structure of the winch braking device achieved in the second embodiment of the present invention. The following explanation will focus on features distinguishing the second embodiment from the first embodiment, with the same reference numerals assigned to components identical or equivalent to those in the first embodiment.

The braking device, having been described in reference to the first embodiment, includes the suspended brake pedal device 140 and the negative type brake 160. In contrast, the braking device achieved in the second embodiment includes a floor-mounted (organ type) brake pedal device 240 and a positive type brake 260.

Namely, while the friction disks are pressed in contact by applying a force to the brake disk 167 via the spring 169 in the first embodiment (see FIG. 2), the friction disks are pressed in contact in the braking device achieved in the second embodiment by operating a brake pedal 241 and thus applying pressure to an oil chamber 268. It is to be noted that the structure achieved in the second embodiment does not include an electromagnetic switching valve 124 (see FIG. 2), which is used as a free-fall mode switching valve in the earlier embodiment.

With the winch braking device structured as described above, a load is power-hoisted up and down and is lowered in free fall as described below. The operator steps on the brake pedal 241 so as to apply a brake on the carrier shaft 156 of the planetary speed-reducer, and in this state, the load is power-hoisted up or down by causing forward or reverse rotation of the hydraulic motor 150. In addition, while the hydraulic motor 150 is in the OFF state, foot operation of the brake pedal 241 is lessened so as to allow the load to drop under its own weight in free fall.

The following is a detailed description of the features distinguishing the second embodiment from the first embodiment.

The brake pedal device 240 includes the brake pedal 241, a rotation link 245, a horizontal rod 246, a reset spring 247 and a rubber member 248. The brake pedal 241 includes a horizontal portion disposed so as to range along the floor surface, a projecting portion projecting from one end of the horizontal portion toward a point above the floor surface and a foot-grip portion disposed at the front end of the projecting portion.

The rotation link 245 is rotatably linked to a rotating shaft fixed to the body frame. An end of the horizontal portion of the brake pedal 241 is fixed to the rotation link 245, and thus, the brake pedal 241 and the rotation link 245 rotate as one around the rotational center O.

One end of the horizontal rod 246 is rotatably linked to the rotation link 245 at a position in the vicinity of a point directly under the rotational center O of the rotation link 245, whereas the other end of the horizontal rod 246 is rotatably linked to a push rod 228. One end of the reset spring 247 is fixed to the body frame at the position under the brake pedal 241, whereas the other end of the reset spring 247 is attached to the rotation link 245.

The rubber member 248, disposed under the horizontal portion of the brake pedal 241, imparts a reaction force corresponding to the operation quantity to the brake pedal 241 as it becomes compressed to the extent corresponding to the operation quantity.

As the operator steps on the brake pedal 241, the rotation link 245 rotates as one with the brake pedal 241, and the horizontal rod 246, interlocking with the rotation link 245, pushes in the push rod 228.

As the push rod 228 is pushed in, the extent of depressurization at the brake control valve 222 decreases, i.e., the secondary pressure increases. With the push rod 228 pushed in, pressure oil is supplied from the pilot pump 113 to the oil chamber 268 from the pilot pump 113, and thus, pressure is applied to a brake disk 267. As the brake disk 267 is pressed toward A in the figure, the friction disks become engaged and thus a friction force is generated. In other words, as the brake pedal 241 is operated, the braking device enters a brake engaged state.

As is the brake pedal device achieved in the first embodiment, the brake pedal device 240 in the second embodiment is structured so that as the operator steps on the brake pedal 241, the reset spring 247 extends and the shortest distance between the rotational center O of the rotation link 245 and the central axis of the reset spring 247, i.e., the moment arm length, becomes smaller.

This structure allows the rubber member 248, functioning as a reaction force-imparting element, to manifest its desired viscoelastic characteristics in an effective manner and thus improves the operability of the brake pedal 241 by canceling out the change characteristics of the reaction torque attributable to a valve spring 227 at the brake control valve 222, which corresponds to the pedal operation quantity, with the change characteristics of the reaction torque attributable to the reset spring 247, also corresponding to the pedal operation quantity. The structure also assures uniformity in the total torque.

Variations such as those described below are also within the scope of the present invention, and one of the variations or a plurality of the variations may be adopted in combination with either of the embodiments described above.

(Variations)

Figure 12A:
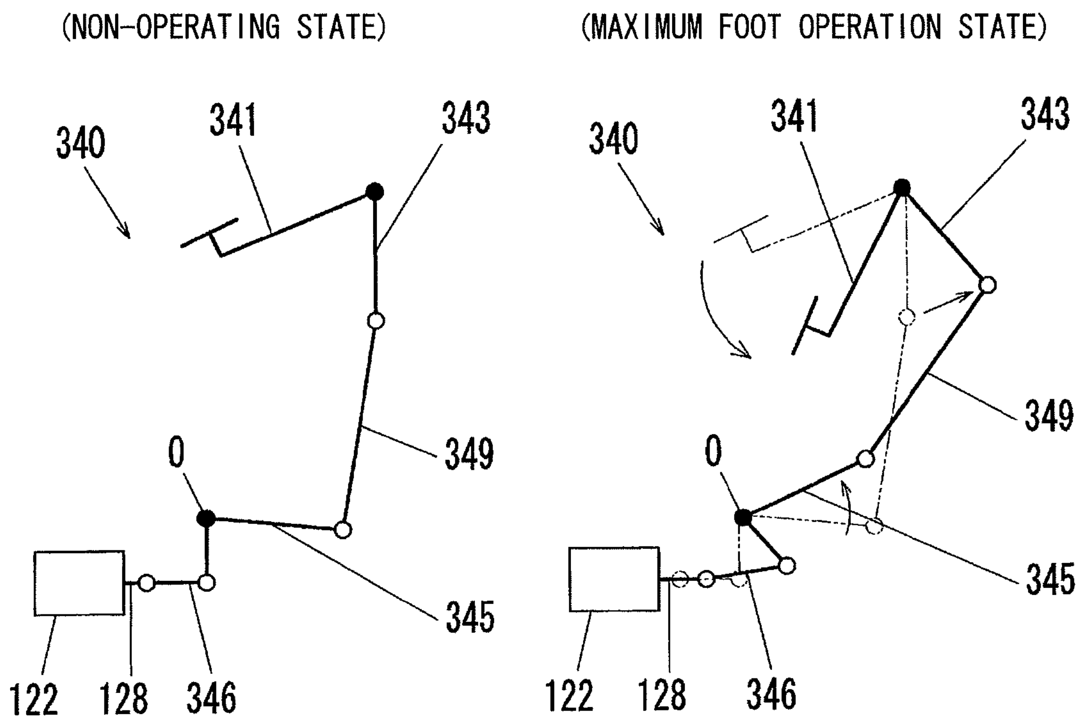
FIG. 12A schematically illustrates a brake pedal device achieved in a variation of the present invention and FIG. 12B indicates the relationship between the pedal angle and the valve stroke.

(1) While the pedal force is transmitted to the brake control valve 122 via a parallel link mechanism in the embodiments described above, the present invention is not limited to this example. As schematically illustrated in FIG. 12A, for instance, the pedal force may be transmitted to the brake control valve 122 via a non-parallel link mechanism. A brake pedal device 340 in the figure comprises a linking member 343 that rotates as one with a brake pedal 341, a rotation link 345 that rotates around the rotational center O by interlocking with a foot operation at the brake pedal 341, a link rod 349 rotatably linked to both the rotation link 345 and the linking member 343, and a valve-side rod 346 rotatably linked to the rotation link 345. The push rod 128 at the brake control valve 122 is rotatably linked to the valve-side rod 346.

Figure 12B:
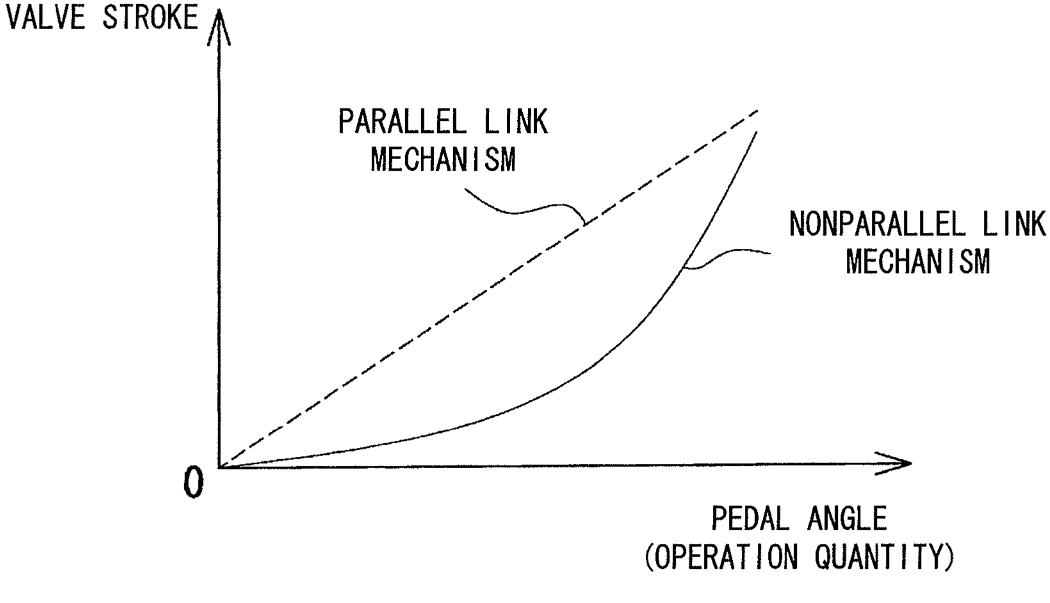

By using a non-parallel link mechanism, as in this variation, the valve stroke characteristics relative to the pedal angle (foot operation quantity) can be modified as schematically indicated with the solid line in FIG. 12B. Namely, through the non-parallel link mechanism, characteristics represented by a quadratic curve, i.e., characteristics, whereby the rate of valve stroke increase at the brake control valve 122 rises as the foot operation quantity at the brake pedal 341 increases, can be achieved. The non-parallel link mechanism in the variation is structured so that the rate of valve stroke increase rises only slightly over the range in which the foot operation quantity at the brake pedal 341 remains small and that the rate of valve stroke increase rises acutely over the range in which the foot operation quantity at the brake pedal 341 is large. This structure makes it possible to minimize the change in the feel of braking, which is bound to occur under different loads. It is to be noted that in conjunction with a parallel link mechanism such as that used in the embodiments described earlier, characteristics whereby the rate of valve stroke change at the brake control valve 122 remains constant relative to the foot operation quantity at the brake pedal 141, as schematically indicated with the dotted line in FIG. 12B, are achieved.

(2) While the rubber members 148 and 248 each function as the reaction force-imparting elements in the description of the embodiments provided above, the present invention is not limited to this example. Namely, the present invention may be adopted in conjunction with a reaction force-imparting element constituted with a mechanical element achieved by combining an oil damper and a spring.

(3) While the present invention is adopted in a braking device that applies a brake on the hoisting drum 105 in the embodiments described above, the present invention is not limited to this example, and the present invention may be also adopted in a braking device for any of various types of winch drums, including a boom derricking winch drum.

The present invention is in no way limited to the particulars of the embodiments described above and freely allows for any alteration or modification that does not depart from the scope of the invention.

Through the embodiments of the present invention described above, an improvement in the brake pedal operability is achieved by allowing the characteristics of a reaction force-imparting element, such as a viscoelastic member, to manifest in an effective manner.

What is claimed is:

1. A winch braking device, comprising:

a brake that is configured to brake a winch drum;

a brake pedal disposed at a vehicle body so as to allow a foot operation to be performed thereat;

a reaction force-imparting element that imparts a reaction force to the brake pedal;

a rotation link that rotates by interlocking with the foot operation at the brake pedal;

a brake valve linked to the rotation link, that applies a secondary pressure to the brake in response to the foot operation at the brake pedal, and that comprises a valve spring; and a tension spring, with one end thereof attached to the vehicle body at a predetermined position and another end thereof attached to the rotation link, that applies a force to the brake pedal along a direction opposite a direction of the foot operation, wherein:

the winch braking device is configured so that as the foot operation is performed at the brake pedal, the tension spring extends and a shortest distance between a rotational center of the rotation link and a central axis of the tension spring becomes smaller;

the winch braking device is configured so that uniformity is achieved in a total torque representing a sum of a brake valve reaction torque occurring as a reaction force attributable to the valve spring of the brake valve, which corresponds to the foot operation at the brake pedal, is applied to the rotation link, and a tension spring reaction torque occurring as a reaction force attributable to the tension spring, which corresponds to the foot operation at the brake pedal, is applied to the rotation link, by canceling out change characteristics of the brake valve reaction torque with change characteristics of the tension spring reaction torque; and a brake pedal force is determined by a sum of a brake reaction force attributable to the reaction force-imparting element and a brake reaction force corresponding to the total torque.

2. A winch braking device according to claim 1, wherein:

the winch braking device is configured so that the tension spring reaction torque decreases as a foot operation quantity at the brake pedal increases.

3. A winch braking device according to claim 1, further comprising:

a link mechanism that transmits a pedal force to the brake valve, wherein:

the link mechanism is configured so that a rate of valve stroke increase at the brake valve rises as a foot operation quantity at the brake pedal increases.

4. A winch braking device according to claim 1, further comprising:

a link mechanism that transmits a pedal force to the brake valve, wherein:

the link mechanism is configured so that uniformity is achieved in a rate of valve stroke change at the brake valve relative to a foot operation quantity at the brake pedal.

* * * * *